United States Patent
Messmer (10) Patent No.: US 11,040,428 B2
(45) Date of Patent: Jun. 22, 2021

(54) METHOD FOR SURFACE TREATMENT, USE OF AN ADDITIVE AND SURFACE TREATMENT AGENT

(71) Applicant: MENZERNA POLISHING COMPOUNDS GMBH & CO. KG, Oetigheim (DE)

(72) Inventor: Rudi Messmer, Loffenau (DE)

(73) Assignee: Menzerna Polishing Compounds GmbH & Co. KG, Oetigheim (DE)

( * ) Notice: Subject to any disclaimer, the term of this patent is extended or adjusted under 35 U.S.C. 154(b) by 0 days.

(21) Appl. No.: 16/420,347

(22) Filed: May 23, 2019

(65) Prior Publication Data

US 2019/0308301 A1    Oct. 10, 2019

Related U.S. Application Data

(63) Continuation of application No. PCT/EP2017/079743, filed on Nov. 20, 2017.

(30) Foreign Application Priority Data

Nov. 23, 2016   (EP) ..................... 16200167

(51) Int. Cl.
*B24C 11/00* (2006.01)
*B24B 55/12* (2006.01)
(Continued)

(52) U.S. Cl.
CPC ............ *B24C 11/005* (2013.01); *B24B 55/12* (2013.01); *B24C 9/006* (2013.01); *B24D 3/346* (2013.01); *C09G 1/02* (2013.01); *Y02P 70/10* (2015.11)

(58) Field of Classification Search
None
See application file for complete search history.

(56) References Cited

U.S. PATENT DOCUMENTS 2,031,362 A    2/1936   Ellis
6,866,784 B2 *  3/2005   Chang ................... B24B 37/04
                                                    134/10
(Continued)

FOREIGN PATENT DOCUMENTS

CN       104496410      *   4/2015
EP       1726364 A2        11/2006
WO       2013069720     *   5/2013

OTHER PUBLICATIONS

International Search Report for International Application No. PCT/EP2017/079743, dated Feb. 22, 2018.
(Continued)

*Primary Examiner* — Stephanie P Duclair
(74) *Attorney, Agent, or Firm* — Jason H. Vick; Sheridan Ross, PC (57) ABSTRACT

A method for the surface treatment of workpieces by means of abrasive media, and a surface treatment composition. The method comprises the steps of providing a treatment tool, providing an abrasive medium, supplying a workpiece having a surface to be treated, surface treating the workpiece, involving removal of material and producing waste products, and processing the waste products, wherein at least one of said steps comprises adding an additive to lower a self-ignition tendency on the part of the waste products, the additive comprising a salt, composed of a carbonate and/or of a halogen anion.

19 Claims, 4 Drawing Sheets

(51) Int. Cl.
*B24C 9/00* (2006.01)
*B24D 3/34* (2006.01)
*C09G 1/02* (2006.01)

(56) References Cited

U.S. PATENT DOCUMENTS

| | | |
|---|---|---|
| 2008/0066512 A1 | 3/2008 | Ushida et al. |
| 2008/0125017 A1* | 5/2008 | Shimizu ............ H01L 21/31053 |
| | | 451/36 |
| 2011/0219704 A1 | 9/2011 | Moon et al. |
| 2015/0247062 A1* | 9/2015 | Nagai ...................... C09G 1/02 |
| | | 51/309 |

OTHER PUBLICATIONS

Written Opinion for International Application No. PCT/EP2017/079743, dated Feb. 22, 2018.
International Preliminary Report on Patentability for International Application No. PCT/EP2017/079743, dated Jun. 6, 2019.

* cited by examiner

METHOD FOR SURFACE TREATMENT, USE OF AN ADDITIVE AND SURFACE TREATMENT AGENT

CROSS-REFERENCES TO RELATED APPLICATIONS

This application is a continuation of International Patent Application PCT/EP2017/079743, filed on Nov. 20, 2017 designating the U.S., which international patent application has been published in German language and claims priority from European patent application 16 200 167.1 filed on Nov. 23, 2016. The entire contents of which are fully incorporated herein.

BACKGROUND

The present disclosure relates to a method for the surface treatment of a workpiece by means of abrasive media. The present disclosure further relates to the phenomenon of easy ignitability or even of self-ignition of waste products in the course of the surface treatment. Further, the present disclosure relates to a surface treatment composition for the surface treatment of a workpiece. The present disclosure also relates to measures for reducing a self-ignition tendency on the part of waste products.

The present disclosure relates generally to the field of surface treatment, for instance to the field of mechanical surface treatment. Where, as part of this disclosure, the term "surface treatment" is used, it is intended to mean polishing processes, brushing processes, grinding processes, compressed-air blasting processes, and similar processes of depleting material and/or levelling surfaces, for instance. The term "surface treatment" also involves, furthermore, material-removing fabrication methods in which workpieces are treated, the removed material being obtained in the form of shavings (chips). Material-removing processes or machining processes are, for example, turning, drilling, milling, and grinding. Polishing, brushing, grinding, compressed-air blasting with blasting medium, and machining processes in general may be construed in principle as subgroups of smoothening treatment processes. In technological terms there may partial overlaps between brushing applications, polishing applications, blasting applications, grinding applications, and machining processes.

Generally speaking, polishing processes, brushing processes, compressed-air blasting processes, grinding processes, and machining processes serve to reduce the surface roughness of components and to generate gloss on the surface of the component, for instance. It is also possible to conceive of applications in which deburring or the like is at the forefront. The transition from machining to polish to machining to grind is frequently a fluid one. Polishing applications are frequently encountered in the field of mechanical precision machining, for instance in the field of mechanical precision machining of surfaces.

The present disclosure further relates, in certain embodiments, to the field of industrial grinding, turning, drilling, milling, brushing, compressed-air blasting, and polishing, respectively, and to the field of highly automated grinding, turning, drilling, milling, brushing, compressed-air blasting, and polishing, for instance. There are known grinding installations, brushing installations, compressed-air blasting installations, fabricating installations for machining, or polishing installations which include, for instance, treatment cells comprising on the one hand the surface treatment apparatus itself but on the other hand also elements for the automated supplying of workpieces to be treated. By way of example, there may be handling installations, such as robots, rotary indexing machines or flatbed polishing machines, for instance, which are designed to grip workpieces for treatment and to bring them into contact with the treatment tool.

It is fundamentally material here whether the workpiece and/or the tool is actively moved with respect to the other element. Not only workpiece-guided machining but also tool-guided machining are known. In the latter case, the workpiece is fastened in a corresponding holder and then is treated by the tool, which is held on a movable head. This type of treatment is employed, for example, in the treatment of large workpieces. Furthermore, the handling installations may be configured so as to bring about a relative movement between the workpiece and the treatment tool, in order to treat the desired regions of the workpiece. In other words, for instance, a handling robot may be provided, which imitates a "manual" swiveling or displacement of the workpiece relative to the (rotating) treatment tool.

The compositions used for the surface treatment are those which are abrasive, in other words comprising, for instance, abrasive grains. An abrasive medium is, for example, a polishing composition, brushing composition, blasting composition or grinding composition. These compositions are typically available in defined presentation forms or states. They may, for instance, be solids, solid pastes, or emulsions. Polishing compositions or the like may further be present, for instance, in the form of unguents, creams and/or burnishes.

In the context of the present disclosure content, furthermore, abrasive media are also understood to include parts of a treatment tool. These parts are, for example, those which can be replaced after treatment, such as, for instance, disposable cutting inserts. The abrasive composition may alternatively be a cutting material which is installed in the treatment tool, examples being tool steel, cemented carbide, cutting ceramics, boron nitride or diamond.

According to exemplary embodiments, the present disclosure relates to polishing. Polishing is routinely based on various active principles. On the one hand, polishing involves a certain removal of material. Furthermore, polishing routinely involves deforming and levelling, of roughness peaks in a surface structure of the workpiece, for instance. During polishing, furthermore, cavities and/or unevennesses may at least partially be filled in.

Apparatuses for polishing comprise, for example, a polishing disk, a polishing plate and/or a polishing belt. The polishing disk may provide a carrier material made, for instance, of natural materials (natural fibers, cotton, sisal, paper, etc.) or artificial materials (synthetic fibers). Sponge-like materials can also be used for polishing disks. A polishing treatment is typically accomplished by the application of a suitable polishing composition to the polishing disk. On the basis of a relative movement between the polishing disk and a workpiece to be treated, the polishing composition is able to enter into contact with the workpiece in order to subject it to treatment, for instance smoothening treatment.

Polishing disks, brushes or similar polishing tools may have active regions comprising substances such as, for instance, cotton, sisal, polymers, papers, felt, leather or similar constituents. Grinding disks comprise fundamentally harder materials. They frequently comprise metals or ceramic materials. The disk (for polishing, brushing or grinding) may be referred to generally as the polishing-composition carrier. The abrasive grain may be formed, for instance, on the basis of alumina, α-alumina, aluminum oxide, aluminum hydroxides, aluminum silicates, magnesium aluminum silicates, calcium carbonates, chromium trioxide, cerium oxide, quartz, iron oxide, siliceous earth, or materials of similar hardness.

The present disclosure relates to the surface treatment of workpieces whose surface for treatment consists of metals and/or metal alloys, for instance, such as light metals, light metal alloys or non-ferrous metals or non-ferrous metal alloys. For example, the surfaces consist of magnesium, aluminum, titanium, iron, copper, zinc, and the like, or of corresponding alloys comprising these metals, such as, for instance, brass, bronze, and the like. During the treatment of workpieces there is removal of material. In this case, for example, the uppermost layer of the surface of the workpiece is removed. At least to some extent the treatment may involve levelling. Furthermore, the surface treatment also relates to the machining of workpieces when not only is the surface removed but also, for example, the workpiece is milled, turned or drilled.

According to exemplary embodiments, furthermore, the present disclosure relates to sandblasting. Sandblasting is interpreted generally as meaning the procedure in which the surface of a workpiece is treated by exposure to a blasting medium by compressed-air blasting with the solid blasting material. Blasting medium used may be, for example, sand, glass beads, glass granules, α-alumina, high-purity alumina, chilled cast shot, steel shot, stainless steel, ceramic, plastic, thermoset, natural kernel, atomized brass powder, garnet sand, SIBASIV (obtainable from Kuhmichel Abrasiv GmbH, Ratingen, Germany), or other, corresponding blasting media. Surface treatment by sandblasting leaves blasting debris behind, which together with the removed material is obtained as waste. Depending on the blasting medium used, the removed material is obtained frequently in the form of dust, which may lead to dust explosions. In order to be able at least partly to limit this dust explosion, the blasting medium is frequently collected together with the resultant waste in a wet separator. In spite of this measure, there continue frequently to be instances of unwanted fires within the wet separator.

It has been observed that accumulations of wastes such as, for instance, grinding wastes, brushing wastes, blasting medium wastes, machining wastes or polishing wastes, especially wastes obtained in the treatment of metals, for instance light metals, are readily and sometimes even spontaneously ignitable. In extreme cases this may even lead to the self-ignition of the wastes. Depending on the type of the waste product concerned and obtained in the course of the surface treatment, the waste products may ignite at different times within the surface treatment process. For example, polishing wastes which are composed of light metal dusts mixed with polishing composition and water tend readily toward self-ignition. In this case, the waste heats up by itself, as a result, for example, of oxidations or other reactions occurring between the individual constituents of the wastes (metal dusts, metal shavings/chips, fats, oils, waxes, etc.), which lead to the heating and ultimately to the self-ignition of the waste, especially when there is no sufficient removal of heat. Wastes of this kind are typically collected over a certain period of time and supplied for disposal. Such wastes are frequently stored on the plant site away from other installations, so that as far as possible in the event of fire no collateral damage occurs.

Where the waste products are metal dusts obtained, for example, in treatment by blasting, these dusts must be removed from the ambient air. In the course of such processes, limiting values for the dust fraction within the air should be complied with. For the de-dusting of the air a wet separator, for example, may be used, in which case the resultant dusts are bound in water. Aside from the de-dusting of the air, wet separators offer the further effect that dust explosions on the part of the metal dusts can be contained. However, the metals are able to react with water to form highly ignitable hydrogen, which in turn constitutes a combustible gas.

The view generally expressed is that the ignition of such grinding wastes, brushing wastes, blasting wastes, machining wastes, and polishing wastes is not one hundred percent avoidable. Another manifestation of this is that such fires have been documented even in highly developed countries with exacting safety requirements.

In view of this background, it is an object of the present disclosure to present a method for the surface treatment of a workpiece that addresses at least some of the above-described drawbacks.

It is a further aspect of the present disclosure to a method that allows at least some of the above-described disadvantages to be diminished or even avoided.

It is a further aspect of the present disclosure to present a method that contributes to a reduction of the self-ignition tendency of treatment wastes, involving at least one of grinding waste, brushing waste, blasting waste, machining waste or polishing waste.

It is a further aspect of the present disclosure to present a surface treatment composition, for instance a grinding, brushing or polishing composition, which lowers the self-ignition tendency of the waste products.

It is a further aspect of the present disclosure to present advantageous uses of suitable additives for surface treatment procedures, and for the treatment a waste products producing in said surface treatment procedures.

SUMMARY

In regard of the method, these and other objects are achieved by a method for the surface treatment of workpieces by means of abrasive media, where the method comprises the steps of:
providing a treatment tool;
providing an abrasive medium;
supplying a workpiece having a surface to be treated;
surface treating the workpiece, involving removal of material and forming waste products; and
processing the waste products, for instance by wetting of the waste products;
wherein at least one of said steps comprises:
adding an additive to lower a self-ignition tendency on the part of the waste products,
wherein the additive comprises a salt, the salt being composed of a carbonate and/or of a halogen anion.

According to a further aspect, the above and other objects are achieved by a method for the surface treatment of workpieces, where the method comprises the steps of:
providing a treatment tool;
supplying a workpiece having a surface to be treated;
surface treating the workpiece, involving removal of material and forming waste products; and
processing the waste products, for instance by wetting of the waste products;
wherein at least one of said steps comprises the following:
adding an additive to lower a self-ignition tendency on the part of the waste products, wherein the additive comprises a salt, composed of a carbonate and/or of a halogen anion.

At least in exemplary embodiments, it is possible, by admixing the additive, to lower the self-ignition tendency of the resultant waste products by lowering the reactivity of those constituents of the waste that potentially pose a hazard. For this purpose, the additive, which comprises a salt composed of carbonates and/or halogen anions, is added in at least one of the component steps of the method. By the wetting of the waste products, the additive is able to dissolve in the solvent used for the wetting, water for example, and to react with the constituents of the waste.

It is initially immaterial here how the additive is admixed, provided the additive is then present in a desired way in the waste products and/or is able to react with a constituent of the waste.

Where reference is made in the context of this disclosure to the supplying of a workpiece having a surface to be treated, this term covers any kind of relative supply movement. In other words, it may be a movement of the tool and/or a movement of the workpiece.

It has been recognized that the fires or self-ignitions are attributable to specific properties of the waste products and mechanisms of action. This also entails a departure from existing generally held theories regarding the causes of the frequency of fires in waste products from surface treatment, especially from polishing treatment, brushing treatment, grinding treatment, machining processes, pressure blasting treatment, and similar treatment processes of material removal or smoothening.

Starting from the workpiece, waste products may be obtained in the form of metal shavings and metal dust. The metal dusts formed may comprise particles some of which are smaller than 500 μm. Metal shavings, which arise for instance in the course of material-removing processing, as for example in the course of grinding, turning, drilling or milling, are composed of correspondingly larger particles. The dusts and the shavings are extremely reactive and tend to combine with the oxygen in the ambient air, evolving substantial heat as they do so. In this context, there may also be instances of the kind known as dust explosions. In order very largely to limit dust explosions, the dust wastes can be captured with a solvent, for example water. In that case the metal dusts react with the solvent. In this case, however, highly ignitable hydrogen is generated, which may react in turn with the atmospheric oxygen in what is called an oxyhydrogen gas reaction. The highly ignitable hydrogen may alternatively be ignited by surrounding heat sources. Accordingly, all waste products may give rise to an increased fire hazard. This hazard is dependent on the nature of the metal, the concentration, and on the particle size.

As well as the dust particles from the workpiece, other waste products are obtained when treating surfaces, and may in turn give rise to an increased fire hazard. These products may involve abrasion of the treatment tool, or else residues of the abrasive medium. Typically it can be assumed that 20% to 50% of the abrasive medium is simply spun away during the treatment, and so this quantity is obtained directly as waste product. As a consequence of this, the abrasive medium represents a considerable proportion of the waste.

"Abrasive media" in the context of this disclosure are understood to comprise, for example, particulate solids, grinding compositions, cutting materials or blasting media. Abrasive media may be contained for example in polishing compositions, brushing compositions or grinding compositions. Furthermore, abrasive media may also be part of the treatment tool itself; cf., for example, cutting materials such as tool steel, cemented carbide, cutting ceramics, boron nitride or diamond.

"Waste products" in the context of this disclosure are understood to comprise all parts which arise or are superfluous in the surface treatment process and that are not joined to the workpiece being treated. The various waste products are, for example, collected and processed by wetting. "Waste" in this context refers to the sum total of the "waste products" which arise in the course of the surface treatment, in the form, for example, of sludge or briquettes. The subtotal of all arising waste products, as waste, forms overall a mixture of potentially combustible materials, which may additionally increase the fire hazard. Waste products are also considered, however, to include those products which arise within the surface treatment as a result of oxidation; examples are highly ignitable hydrogen, which may form in the reaction of metal dusts and water.

The waste products are typically processed by wetting; for reasons, for example, of disposal and/or safety. This prevents the dust being released, the prevention being accomplished, for instance, by deposition of the dusts using liquids, in order as far as possible fundamentally to prevent any reactions of the metallic constituent. Possible processing methods are as follows: wet methods; dry methods with wet deposition of the dust by immediate wetting of the dust as it is released; and dry methods with wet deposition of the dust by wetting of the dust in a wet separator. These methods are governed, for example, by occupational hygiene provisions, and constitute a first processing step for the waste products formed.

In the case of wet methods, the workpiece and/or the treatment tool is or are wetted with water or other suitable cooling lubricants, and so the corresponding abraded material is obtained in the form of sludge or a mixture. Here, the metal dusts and metal shavings removed from the material can react with the water or with the other suitable cooling lubricants.

In the case of dry methods with wet deposition of the waste products by immediate wetting of the waste as it is released, this waste is wetted—immediately downstream of the site of its formation—with water, optionally with tension reducer additives or with other suitable liquids, so that it is bound completely, as far as possible, and is obtained in the form of sludge or as a mixture. Treatment machine and addition of liquid are coupled with one another in such a way that dry operation is not possible.

In the case of dry methods with wet deposition of the waste products in a wet separator, the waste products arising are, at the point of their formation, drawn off under suction as completely as possible as applied to a suitable wet separator.

The aforesaid processing methods are aimed primarily at de-dusting the air and also at preventing dust explosion of the dry waste products composed of extremely small surface particles of the workpiece. It has been observed, however, that a fire hazard continues to be posed by the resultant "wet waste" or sludge which is obtained in one of the above-described processing operations. This self-ignition tendency may be minimized, according to one aspect of the present disclosure, by addition of an additive. There is at present no other way to effectively counter the potential fire hazard.

The potential hazard arising from this waste is due to the presence of small and extremely small metallic particles in the rest of the matrix (made up, for example, of liquids, especially water, fats and oils; waste products, etc.), these particles reacting as a result of their high surface areas, with atmospheric oxygen, water and humidity, and possibly involving heat as they do so. Because this reaction is exothermic (i.e., releases energy/heat) and since very generally the reaction rate rises with the temperature, and since, moreover, waste stores are often situated such that there is a buildup of heat (in relatively large containers, for example), such reaction phenomena are likely to proceed with temporal acceleration. For instance, under such conditions, hydrogen (in the extremely reactive "status nascendi") is regularly formed, and may even lead to instances of spontaneous self-ignition, possibly together with any parallel exothermic oxidative reactions of the metals.

The probability of the self-ignition of the (initially wet) waste, for instance of stored waste, is further increased, additionally, by the evaporation of water. For example, the wastes are collected in open vessels, and there is evaporation of water. As a result, the waste becomes increasingly dry over the course of time, and the concentration of combustible materials within these wastes increases. A wet waste provides the effect of intrinsic cooling, allowing the temperature of the waste to be held, for example, below 100° C. (degree Celsius). Furthermore, the water may react with the uppermost layer of the metals, to form a protective coat. Evaporation of water is therefore undesirable in at least some cases, since the tendency towards self-ignition is dependent on the degree of drying of the waste. Evaporation is dependent on the ambient temperature, and so under warm weather conditions, for instance, such waste may quickly ignite. This may occur, for example, in storage hauls or during transport in open containers; possibly, indeed, trucks may catch fire, threatening major damage.

The probability of self-ignition typically increases with the surface area of metallic particles, the degree of dry of the waste, and with the accompanying, decreasing residual moisture content. Whereas there is virtually no hazardous reaction of compact, solid metal pieces, barring exposure to acids, alkalis or hot water, or heating beyond the melting temperature (when involved in a fire), small metal particles such as powders, metal braids and fine shavings have differing properties, owing to the substantially greater surface area.

The self-ignition tendency of the resultant waste products raises the cost and complexity of the surface treatment method as such. In addition, there are hindrances on the storage, the transporting, and the disposal of the waste products.

Generally, and for the purposes of this disclosure, self-ignition refers to the process wherein a system under its own energy heats up to an extent (to an ignition temperature) that combustible substances present become ignited. This may involve the ignition of a combustible substance without the action of an ignition source, i.e., without external ignition, by sparking or flaming. The ignition temperature is the temperature at which substances exhibit self-ignition on hot bodies (ignition temperature).

The ignition temperature and also the capacity for self-ignition are dependent on the residual water content, pressure, the oxygen concentration, and on catalytic influences. The ignition temperature of compounds or compositions may be reached if exothermic reactions (with release of heat) occur within them and the heat of such reactions cannot be removed to the outside. The self-ignition processes break down into the stages of self-heating and of self-ignition. A precondition for the increase in temperature is a chemically reacting substance and/or a biological process which provides the necessary energy. The requisite amount of heat is generated by a spontaneous chemical reaction (for example, auto-oxidation) or physical events (friction, impact, electrostatic charging) in the fire materials themselves or on their surface. The majority of self-heating and ignition processes are tied to a startup time, associated with a buildup of heat, and also the correct amount of atmospheric oxygen. Even substantial adsorption of oxygen on finely divided surfaces (dust) may give rise to self-ignition.

According to an exemplary embodiment, the salt comprises a carbonate and/or a halogen anion. The halogen anion is a fluoride, for instance. According to exemplary embodiments, the additive consists of a salt. According to alternative embodiments, the salt forms a constituent of the additive.

According to an exemplary embodiment, the workpiece surface to be treated may consist of metals and/or metal alloys, for instance of light metals and/or of light metal alloys, and, for instance, of nonferrous metals and/or nonferrous metal alloys. In accordance with the present disclosure, the surface of the workpiece may be present in the form of coating, and so the basic structure of workpiece may consist of a different material.

This disclosure uses the terms "light metals", "light metal alloy", "nonferrous metal", "nonferrous metal alloy", "metal alloy", and "metal".

Light metals, generally, are metal alloys with a density below 5 g/cm$^3$. In principle it is possible to use aluminum, magnesium, titanium, and also, to a lesser extent, beryllium and lithium, and also further elements, for instance, as alloying elements in a small concentration. In recent years the use of light metals has acquired increasing importance. Critical factors in this are the physical properties, such as the low density and, associated with it, the low moment of inertia and the low weight of the products. Furthermore, the easy formability of workpieces (by means of casting or injection molding, for instance) and their relative ease of machinability are of advantage, in certain cases.

Nonferrous metals include for example, the following metals: cadmium (Cd), cobalt (Co), copper (Cu), nickel (Ni), lead (Pb), tin (Sn), and zinc (Zn). These materials are distinguished by their color, which occurs both in their pure form and in corresponding alloys. Nonferrous metals possess a greater density (above 5 g/cm$^3$) than the light metals and are therefore included among the heavy metals. Examples of alloys of nonferrous metals are brass (copper and zinc) or bronze (copper and tin). Further exemplary alloys are those of nonferrous metals and other nonferrous metals or aluminum, titanium, magnesium, etc.

In trials it has been verified that the oxidation of metal particles from the removed material of the workpiece can be regarded as a major reason for the self-ignition of the waste product or the waste. This is true of all of the aforementioned metals and may in principle relate to other metals. The metal particles may form what are called hot spots. As a result there is a self-heating of the waste and ultimately its self-ignition. In certain embodiments of the present disclosure, a reason for surprise of this finding was that the assumption hitherto had been that the finely granular, particulate material removed could be rendered unreactive by wet processing alone.

In so far as the waste comprises, such as fats or oils, which are present, for example, in polishing compositions, the assumption was that for instance the unsaturated compounds in the oils/fats of the abrasive medium, if distributed over a large surface area, generate sufficient heat through direct oxidation of atmospheric oxygen to trigger, under appropriate conditions, a smoldering fire and eventually an open fire. In other words, the assumption hitherto was that the self-ignition tendency comes about as a result of the hydrogenation of the double bonds of the fats, and that the metal particles ignite as a result of the heat formed in that process. This, however, is not the main reason for the self-ignition.

Generally speaking, carbonates are to be understood as salts and esters of carbonic acid ($H_2CO_3$). In the context of the present disclosure, carbonates are understood as the salt of carbonic acid, at least in certain embodiments. Deriving from the two-proton (dibasic) acid are two series of salts, namely the hydrogen carbonates, which are also called primary carbonates, having the general formula $M^+HCO_3$, and the secondary carbonates, having the general formula $M^{+2}CO_3$. The secondary carbonates are based on the doubly negatively charged carbonate ion $CO_3^{2-}$. These carbonates may form a constituent of the additive in the present disclosure.

Halide anions or halides, generally and in the context of this disclosure, are the singly negatively charged ions of the elements of main group seven (to be more exact, of group 17) of the periodic table, in other words of the halogens ($F^-$, $Cl^-$, $Br^-$, $I^-$, $At^-$). Halides and halogen anions are used as synonymous terms in this disclosure. Halides form compounds which differ by virtue of their chemical bonding.

The first groups formed by the ionic compounds (salts), which because of the large difference of electronegativity between the elements involved, consist of anions and cations and are held together by electrostatic interactions. The halides, additionally, may enter into covalent compounds; in these compounds, the difference in electronegativity is not as great as in the aforementioned ionic compounds. The bonds nevertheless have charged polarities. A further group of the halides is formed by the compounds in which the halide ions are present bound as a complex. In other words, the halide anions are present as ligands. In the context of the present disclosure, the halide anions may be present in bound form in any way in the additive and/or, ultimately, in the waste.

Through the addition of the additive which comprises a salt composed of a carbonate and/or of a halogen anion, the metals are bound in unreactive form, as a complex or salt, for example. Resultant compounds may, for example, be the following: magnesium carbonate ($MgCO_3$), aluminum carbonate ($Al_2(CO_3)_3$), zinc carbonate ($ZnCO_3$), magnesium fluoride ($MgF_2$), aluminum fluoride ($AlF_3$), zinc fluoride ($ZnF_2$), or as titanium fluoride ($TiF_4$). In other words, there is a chemical reaction between the metals and the carbonates and/or halides, and so the combustible metals are no longer available as reaction partners.

Where the term "unreactive form" is used in this disclosure, it means, for example, that a corresponding substance is now no longer classified as ignitable or as capable of self-ignition. According to the present disclosure, unreactive substances are those which are not put into the GHS labelling glass GHS02, for instance. That class relates to highly ignitable, readily ignitable, and ignitable substances.

The addition of the additive may in principle take place in at least one component step of the surface treatment method, subject to the proviso that the additive ultimately is present in the waste products or in the waste. For example, the additive may be added in a plurality of these steps, for instance if there is a risk of formation of considerably readily ignitable dusts. Thus, for example, the treatment tool may comprise the additive as well as the abrasive medium. Alternatively or additionally, the additive may be added in the component step of the processing of the waste products.

According to a further embodiment of the method, the workpiece surface to be treated consists of magnesium, magnesium alloys, aluminum, aluminum alloys, titanium, titanium alloys, zinc or zinc alloys.

In the production of consumer goods, metallic magnesium, magnesium alloys, aluminum, and aluminum alloys have now taken up a further position, whether as a material in mechanical, automotive, and aircraft engineering or in diverse articles of everyday life, including for instance the construction fittings industry. For instance, in lightweight construction engineering, these metals are of special interest. They may form lightweight materials, for motor vehicle applications, for example. The use of these metals may significantly improve the economics of a vehicle. For zinc and/or its alloys as well there are diverse applications. Exemplary alloys in this case are, for example, brass alloys. A property of brass is that it is readily processable and deformable. Alloys of zinc with aluminum and magnesium are used for the production, among other things, of vehicle parts.

The major amount of the magnesium produced is used for alloys with aluminum. There are, however, also components produced which consist of alloys whose principal constituent is magnesium. A distinction is made between aluminum alloys with up to 11% Mg, and the true, extremely lightweight alloys with magnesium as their main constituent.

A potential disadvantage, however, is that these metals (Mg, Al, Ti and Zn), especially in the form of very small particles, such as metal dusts or metal shavings, for example, can easily ignite. This occurs even after prior processing with a solvent—water for example.

In chemical terms, aluminum, magnesium, titanium, zinc, and other metals possess a massive affinity for oxygen. This is evident, for example, in a thin film of oxides that forms almost instantaneously when very small metal particles are exposed to the atmosphere. The oxide film is inert and protects the underlying metal against further attacks. If a metal powder particle is heated to the ignition point, the mass of the particle is so small that the entire particle can oxidize almost instantaneously. Accordingly, a large part of these particles will "combust".

According to an exemplary embodiment of the method, the salt is selected from the group consisting of sodium carbonate, potassium carbonate, and sodium fluoride. Combinations thereof are also conceivable in principle. The property provided by these salts is that they are relatively inexpensive and readily available on the market. Furthermore, because of their solid aggregate state (at room temperature), the salts are easy to handle. Sodium carbonate and potassium carbonate, moreover, are among the nontoxic salts, and so there is no further hazard arising from these salts.

The processing of the waste products is carried out by wetting, for example. As already explained above, the waste products formed are captured wet-chemically, for instance. This initially reduces the hazard of fires or explosions to a relatively low degree. Through the addition of the additive in a component step of the method, the self-ignition tendency and the associated fire hazard are lowered once again, for instance to a level which can be tolerated in the context of the specific circumstances.

In the context of the present disclosure, the waste products can be wetted with any suitable liquid; as a washing liquid, for example, it is possible to use pure solvents such as water, or else suspensions such as milk of lime, for instance. To a skilled person it will be clear here which amount of liquid is to be used. Parameters requiring observation in this case are the avoidance of fires, the costs involved in disposing of the waste produced, the nature of the liquid, etc.

According to a further embodiment of the method, the processing of waste products is carried out in a wet separator, involving the formation of wet waste. This embodiment differs from the aforementioned embodiment only in the utilization of wet separator. The liquids used may be used analogously.

Generally and in the context of this disclosure, a wet separator or so-called absorber is understood to be a technical apparatus in which a gas stream is brought into contact with a liquid stream. The mode of action of wet separators is based on the transfer of particles from a flowing, particle-laden gas into a liquid. This requires the formation of corresponding phase boundaries between gas and liquid, and the generation of a relative movement between these two phases. One technique for obtaining phase boundaries while maximizing the intensity of gas/liquid mixing is to disperse one phase into the other. This means, for example, that swarms of bubbles in a liquid or collections of drops in gas are generated, or systems in which the liquid takes the form of a more or less disaggregated jet. Another possibility in principle of contacting gas and liquid with one another is that of flow around liquid-wetted bodies. The large number of variants which are encountered in wet separator systems derives from the diversity of the possibilities for forming phase boundaries and for generating the relative movement between gas and liquid.

The constituents of the gas stream that undergo the transition may be solid, liquid or gaseous substances, for instance the waste products which are obtained in the surface treatment.

According to another embodiment of the method, the additive is added within the wet separator and/or to the wet waste. An effect provided by this embodiment, at least in certain configurations, is that the additive is present basically completely in the wet waste and so lowers the self-ignition tendency thereof. The carbonates and/or halide anions in this case are able to react directly with the igniting metals in the liquid, especially aqueous, waste, to form unreactive compounds.

The additive may be added in solid form or in diluted form, dissolved for instance in a solvent, in a component step of the method. According to an exemplary embodiment, the additive may be present in solution in a solvent, water for example, and may be used as the liquid stream in the wet separator. This allows the addition of the additive to be controlled automatically. Further, the additive may be introduced manually into the resultant wet waste, or may alternatively be passed via a line into the wet waste. For this purpose, the additive may for example consist only of the salt composed of carbonate and/or of halide anion.

According to a further embodiment of the method, the processing of the waste products involves briquetting, the additive being added before the briquetting. Also with this kind of post-processing, the additive is able to contribute to reducing a self-ignition tendency. This may relate to time before the briquetting, in which the waste products are at least partially in dust form.

According to a further embodiment of the method, the processing tool is configured as a grinding disk, brushing disk, polishing disk, machining tool or blasting system. As already observed, an exemplary surface treatment in the context of this disclosure is that of industrial grinding, machining, brushing, blasting and/or polishing. Employed as the processing tool for these purposes are polishing disks, milling tools, lathes, brushing disks, blasting systems or grinding disks. The processing tool used may also comprise other machining tools.

According to a further embodiment of the method, the additive is introduced into and/or applied to the grinding disk, brushing disk, machining tool or polishing disk. In the context of this disclosure, this can be accomplished, for example, by impregnation in the additive. As a result, for instance, the support material is saturated with the additive. Another possibility is that of coating the additive up to the grinding, brushing or polishing disk or the machining tool. Here as well, the support material is the carrier of the additive, but in the case of this embodiment the additive is located to a greater extent on the outermost layer of the support material of the treatment tool. For this purpose, the additive takes the form of a solution, and so as well as the salt there are further adjuvants and liquids present. Where the surface treatment is a blasting treatment, in which blasting medium is accelerated using compressed air onto the surface under treatment, the additive may also be combined with the blasting medium.

In a further exemplary embodiment, the additive may also be incorporated into material during the manufacture of the support material. This is an option when the support material is produced from artificial materials, such as synthetic fibers, for instance.

According to a further embodiment of the method, the abrasive medium is a polishing composition, brushing composition, blasting medium, a cutting material or grinding composition. Polishing compositions, brushing compositions or grinding compositions consist typically of fats, oils, and the abrasive medium itself, for instance the abrasive grains. Abrasive grains but also the blasting medium may consist, for example, of alumina, $\alpha$-alumina, aluminum oxides, aluminum hydroxides, aluminum silicates, magnesium aluminum silicates, chromium trioxides, calcium carbonates, cerium oxides, quartzes, iron oxides, siliceous earths or the like. Depending on the intended application, the abrasive grains may have for instance a size from 0.1 µm (micrometer) up to around 200 µm. The abrasive grains may form, for instance, a mass fraction of 20% to 70% of the abrasive medium. Cutting materials typically comprise cemented carbide, tool steel, cutting ceramics, boron nitrides or diamond.

According to a further embodiment of the method, the polishing composition takes the form of a solid paste or an emulsion. Emulsions for the surface treatment consist typically of a mixture of water, fats, oils, and granular abrasive (typically based on ceramic materials) which ideally is present in uniform distribution in the emulsion. The emulsions can be delivered through spray nozzles and sprayed onto polishing tools. Solid pastes for the surface treatment represent a second key group of grinding or polishing compositions. The solid pastes typically are mixtures of lipids (encompassing, for instance, fats, oils, and waxes), adjuvants admixed to them, and also a corresponding fraction of granular abrasive, which ideally is admixed in uniform distribution to the support material.

According to a further embodiment of the method, the additive is added to the polishing composition. This too ensures that the self-ignition tendency of the resultant waste product is lowered. The effective carbonates and/or halogen anions enter the actual waste, in an exemplary embodiment, in the form of spent polishing composition, as a waste product, together with the other waste products. In the waste, the ions are able to react with the metals to form unreactive compounds, and so the self-ignition tendency is lower in this way as well. The effect of the lowering of the self-ignition tendency by means of used polishing compositions has been verified by trials.

This exemplary embodiment has the effect that the surface treatment can therefore take place automatically, without additional steps of the addition of the additive, to the waste products and/or to the waste, for example. The additive is already present in the abrasive medium.

Nevertheless, the additive can also be admixed in other ways, in accordance, for instance, with the exemplary embodiments described above.

According to a further embodiment of the method, the salt is present at less than 10 wt % (percentage by weight), preferably less than 5 wt %, more preferably less than 2.5 wt %, but more than 0.01 wt % in the abrasive medium. It has been shown using trials that even small amounts of salt may be sufficient to reduce the self-ignition tendency of the waste. Furthermore, these amounts have no or no substantial detrimental effect on the activity of the abrasive medium, in certain embodiment. Hence it is possible to achieve identical or at least approximately the same surface treatment outcomes as those achievable with abrasive medium without the corresponding salts.

The above and other objects are also achieved by a use of an additive which comprises a salt composed of a carbonate and/or of a halogen anion, for instance a fluoride, for lowering a self-ignition tendency on the part of the waste products.

As already observed above, waste products which comprise combustible substances, especially metal dusts, may undergo self-ignition and cause fires and even, possibly, explosions. The solution, the conversion of the metals into unreactive compounds, can also be expanded analogously to further waste products in accordance with this exemplary embodiment. Waste products in this case may for example be those obtained in the processing of metals. These are wet wastes, or wastes possessing a liquid medium, allowing the chemical reaction to take place to form the unreactive compound.

According to a further exemplary embodiment of the use, the waste products in question are polishing wastes, brushing wastes, blasting medium wastes, machining wastes or grinding wastes—generally, wastes from surface treatment. The wastes typically include residues of a polishing composition, brushing composition, blasting medium, cutting material or grinding medium, and also material removed from the treated workpiece, especially metal shavings or metal dusts.

According to an exemplary embodiment, the salt comprises a carbonate and/or a halogen anion. The halogen anion is a fluoride, for instance. According to further exemplary embodiments, the salt is selected from the group consisting of sodium carbonate, potassium carbonate, sodium fluoride, and combinations thereof.

According to a further embodiment of the use, the waste products are obtained in at least one component step of the method disclosed.

Further, the above and other objects are also achieved by a composition for the surface treatment of a workpiece, wherein the surface treatment composition comprises a self-ignition inhibitor additive, and wherein the self-ignition inhibitor additive is a salt composed of a carbonate and/or of a halogen anion, a fluoride, for instance. The discussed composition may be a polishing composition, brushing composition, blasting medium, cutting material or grinding composition, for instance.

The surface treatment composition may for example be solids, a paste (solid paste) or an emulsion. According to an exemplary embodiment, the surface treatment composition further comprises abrasive grains, for instance ceramic abrasive grains, and lipids, the lipids being selected from the group consisting of fats, oils, and waxes. The surface treatment composition may also comprise water. Further constituents are conceivable and familiar to the skilled person, such as aggregates, for instance.

According to a further exemplary embodiment, the surface treatment composition is employed for use in the disclosed method for lowering a self-ignition tendency on the part of the waste product.

It will be appreciated that the herein-described methods, uses, and surface treatment compositions may be further refined in the same or a similar way, even if this is not explicitly mentioned. Further, it is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features, properties, and advantages of the invention will become apparent from the description hereinafter of exemplary embodiments, with reference to the drawings. These exemplary embodiments are purely illustrative and do not limit the subject matter of the invention.

Reference is made to the appended figures, which show the following.

DETAILED DESCRIPTION

Figure 1:
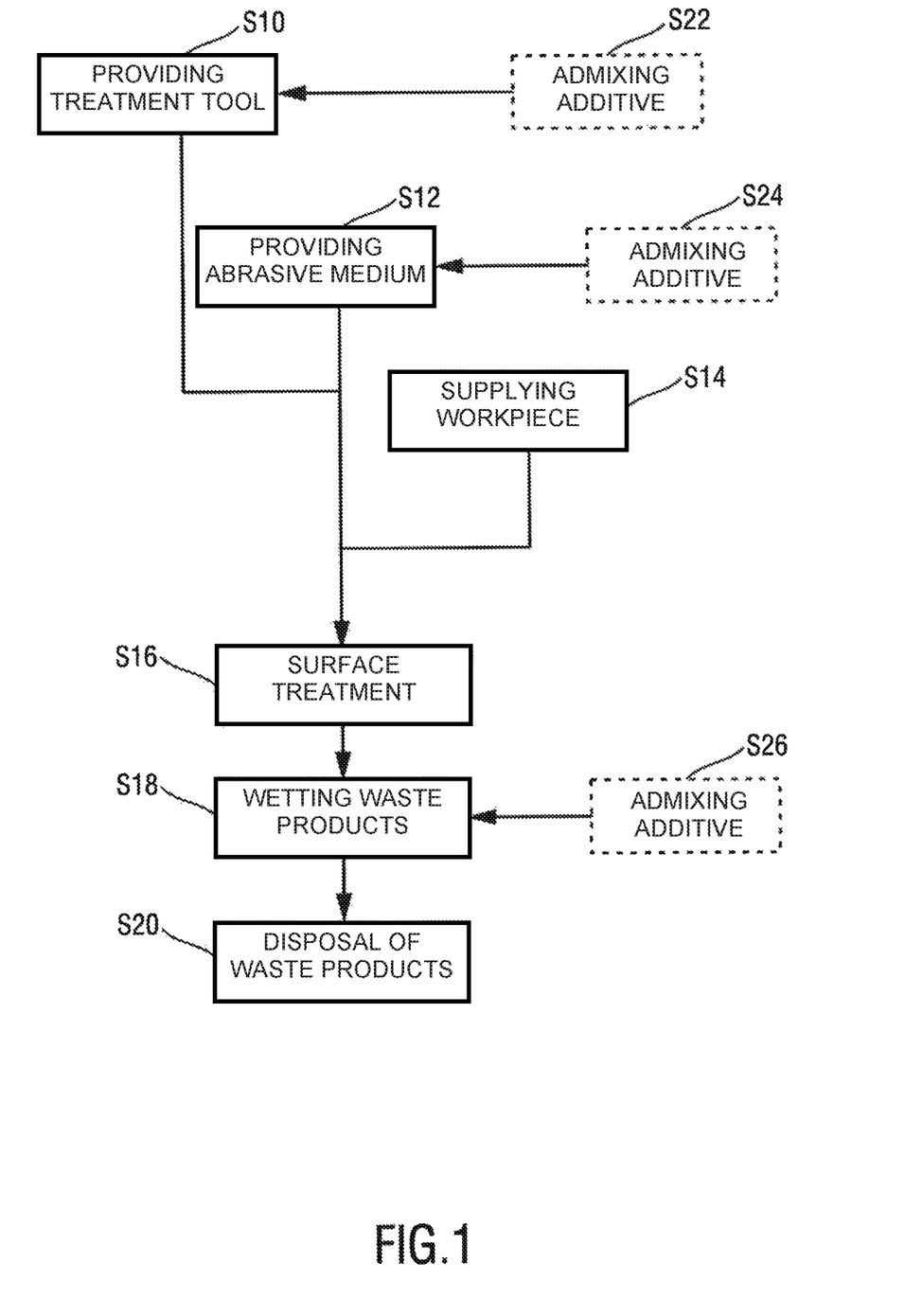
FIG. 1 illustrates, using a block diagram, an exemplary embodiment of a method for the surface treatment of workpieces.

FIG. 1 illustrates, using a block diameter, an exemplary embodiment of a method for the surface treatment of workpieces. By way of example, the method may comprise a material-depleting and/or material-levelling grinding treatment, brushing treatment, blasting treatment, machining treatment or polishing treatment of metallic workpieces.

In a step S10, the method comprises the provision of a treatment tool, such as a grinding disk, brushing disk, blasting system, machining tool or polishing disk. The treatment tool is, by way of example, of disk-like design and is accommodated on a spindle which is coupled to a drive. The treatment tool is designed to accommodate a surface treatment composition. For this purpose, the treatment tool may be configured with at least some absorbency and/or porosity. The treatment tool may for example comprise fibers, woven fabrics and/or sponge-like materials.

A further step S12 relates to the provision of an abrasive medium for the surface treatment. By way of example, this may be a grinding composition, brushing composition, blasting medium, cutting material or polishing composition. The medium may take the form, for example, of a solid, solid paste or emulsion. The medium comprises typically abrasive constituents, for instance granular abrasives, cutting materials and/or blasting medium, which may be embedded in a carrier material, such as a lipid-based carrier material. The step S12 may further comprise application of the medium to the treatment tool provided in step S10. This may be done manually or automatically. Depending on the nature of the surface treatment composition, the application may involve spraying, pouring, printing, and similar processes.

A further step S14 involves the supplying of a workpiece having a surface to be treated. The workpiece is at least partially metallic and is, in certain embodiments, fabricated from light metals or nonferrous metals, such as from aluminum, magnesium, zinc or titanium, or from alloys containing aluminum, magnesium, titanium and/or zinc. The supplying may comprise automatic or manual supplying. The workpiece is typically supplied to a treatment tool arranged with a fixed location but coupled to a drive. This, however, is not to rule out the supplying of the treatment tool onto the workpiece, according to alternative exemplary embodiments. In general the step S14 may include a relative movement between the workpiece and the treatment tool.

As well as workpiece-guided treatment it is also possible to conceive of tool-guided treatment. In that case the workpiece is fastened in a corresponding mount and then treated by a multi-dimensionally pivotable head of the tool; accordingly, the "supplying" should be understood in relative terms. In other words, this may be a tool-guided or else a workpiece-guided treatment.

This is followed by a step S16, which comprises the actual surface treatment of the workpiece. Here, material is removed from the workpiece, for instance chips or other small particles, which can form dust. Furthermore, the treatment gives rise generally to abraded material of the treatment tool, in the form, for example, of fiber residues, composed of cotton shreds and/or dusts, for instance. In addition there is further waste, owing to the surface treatment composition. This may relate on the one hand be part of the composition which has not even been involved in the treatment itself, but instead has been thrown away from the treatment tool. It may further relate to portions of the surface treatment composition which have made contact with the workpiece. The waste generated during the course of the surface treatment hence comprises diverse constituents.

Waste products arising in the course of the surface treatment are processed by wetting in a step S18. This may involve removal of the waste from the location of the treatment itself. This may be done, for example, by suction withdrawal units which operate continuously. Generally, however, waste products remain at the location of the processing, having not been sucked up. These waste products can be removed mechanically, such as manually by regular cleaning, for example. According to at least some exemplary embodiment examples, the step S18 comprises a treatment of the waste products in a wet separator. Other modes of waste treatment and waste processing are conceivable. It is, for example, not unusual for the waste products to be put into interim storage, in order, for instance, to collect sufficiently large quantities, which can then be disposed of.

A further exemplary embodiment of the processing of waste products involves the briquetting of the waste. In this case the waste is compressed and so dewatered, and at the same time oxygen is withdrawn from the waste. In this connection, further binder additions are frequently added to the waste.

A further step S20 relates to the disposal of the waste products. This requires specialist knowledge and specific operations, and so is often done by qualified external firms.

Both during and after the treatment there is a risk in principle of self-ignition of the waste, or of fire due to external ignition. In theory this may even take place at the location of treatment itself. However, this risk has been significantly reduced by safety provisions, which prescribe, for instance, the use of suction withdrawal units. Now and then, however, it has been observed that collective wastes tend towards spontaneous self-ignition. The risk of this rises in principle with the quantity of waste and of the storage time, and with the associated evaporation of water. Other influencing factors have already been explained above.

In the context of the present disclosure, a proposal is made to add or admix, in at least one component step of the method, an additive which ultimately lowers the self-ignition tendency of the wastes.

Steps S22, S24 and S26 relate in each case to the admixing of the additive. Steps S22, S24 and S26 represent different possibilities for the admixing of the additive. Steps S22, S24 and S26 can be implemented. This does not, however, rule out the utilization of two or more of the steps S22, S24 and S26 for admixing the additive. What is essential is that the additive is detectable at least after the processing of the waste products (step S18).

For example, in the step S22, the additive can be added during the provision of a treatment tool (step S10). Hence it is possible to conceive of the treatment tool being treated accordingly. The additive may be introduced into the waste, for instance, via the abraded disk material which is formed during the treatment and which forms a constituent of the resultant waste. Alternatively, the additive may be present in solution in the solvent which is used in the processing of the waste products.

The additive, furthermore, may be added in accordance with step S24, for example, as part of the provision of the surface treatment composition (step S12). In other words, the compositions utilized, such as grinding composition, brushing composition, blasting medium, coating material or polishing composition, may be provided with the additive. The surface treatment composition forms a constituent of the resultant waste, and so the additive may ultimately be available there in order to lower the reactivity of the waste, especially of metal shavings and metal particles in the waste.

Furthermore, in accordance with step S26, for example, the additive may be introduced into the waste as part of the processing of the latter (step S18). This may involve the waste being thoroughly mixed with the additive. The additive may also be added during the briquetting of the waste products.

Working Examples

In the course of the surface treatment, for instance in the case of polishing, various polishing compositions are employed, depending on the material, the desired surface quality, and other factors. The wastes resulting in this case consist, for example, of the remnants of the polishing composition, cotton fibers of the polishing disks, and also the abraded metal generated from the material. This waste is drawn off by suction, for example, passed through wet separators, and subsequently stored. In the course of storage there are occasionally instances of spontaneous self-ignitions of the wastes, which need to be brought under control through the deployment of the fire service.

It has been possible to show that the trigger for this self-ignition is the heat of reaction associated with the oxidation of abraded light-metal particles. In the trials described below additives suitable for suppressing or at least attenuating this reaction have been investigated.

The measurement method used was Accelerating Rate calorimetry (ARC). Accelerated Rate calorimetry (ARC) is a thermal analytical method in which a sample is stored in a controllable oven. In the method, the temperature of the sample is measured and the oven is run in accordance with the sample temperature, so that there is no heat flow whatsoever from the sample into the oven or vice versa. Accordingly the conditions prevailing are at least approximately adiabatic.

In this way it is possible to simulate the situation inside a large sample, in which the loss through thermal conduction to the surroundings is virtually zero and the heating takes place exclusively as a result of the chemical reactions in the sample. Because the rate of chemical reactions is temperature-dependent, the resultant heat of reaction raises the reaction rate and hence increases the heating within the interior of the sample. There is therefore a self-reinforcing effect, and accelerated heating may occur.

During a measurement, the sample is initially brought to a defined starting temperature and held there. If no temperature increase is recorded within a given time window, the oven temperature is raised by a fixed amount and then the sample as well is observed for a temperature increase. This procedure is continued until the sample exhibits intrinsic heating.

From this moment on, the oven automatically regulates itself to the actual sample temperature. This is continued until either the intrinsic heating comes to a standstill (as a result of complete reaction, for example) or until upper pressure or temperature limits are reached.

The measurement is plotted as the Self Heating Rate (SHR in °C./min) against the temperature (in °C.). From the shape of the curve here it is possible to ascertain whether there is accelerated heating and, if so, the temperature at which it begins.

1. Preparatory Work

In a first trial the aim was to find out which compounds are suitable for reducing the self-ignition tendency of polishing composition waste. First of all, the salts sodium fluoride and sodium carbonate were chosen as potentially suitable candidates.

The raw material used was real polishing composition waste arising in the surface treatment of aluminum-containing workpieces. As part of the surface treatment, the waste products arising were collected without prior processing. The waste, therefore, was not processed in a wet separator, and consequently was largely dry.

The first trials involved preparatory work in accordance with the steps below, before an ARC measurement was carried out:
1. Dissolving the salt in question (amount in % based in each case on 10 g of polishing composition waste) in 200 ml (milliliter) of deionized water;
2. Stirring 10 g of polishing composition waste into the solution, leaving it to stand, and re-agitating;
3. Allowing the salt to act (usually 24 hours);
4. Isolating polishing composition waste by filtration and washing it with distilled water;
5. Drying for 24 h in a fume cupboard at room temperature; and
6. Storage, pending the ARC measurement, in a desiccator under molecular sieve.

Step 1 in conjunction with step 2 in this case simulates processing in a wet separator, which is frequently used in the case of surface treatment. Accordingly, the findings obtained can also be applied to wastes which have passed through a wet separator.

Figure 2:
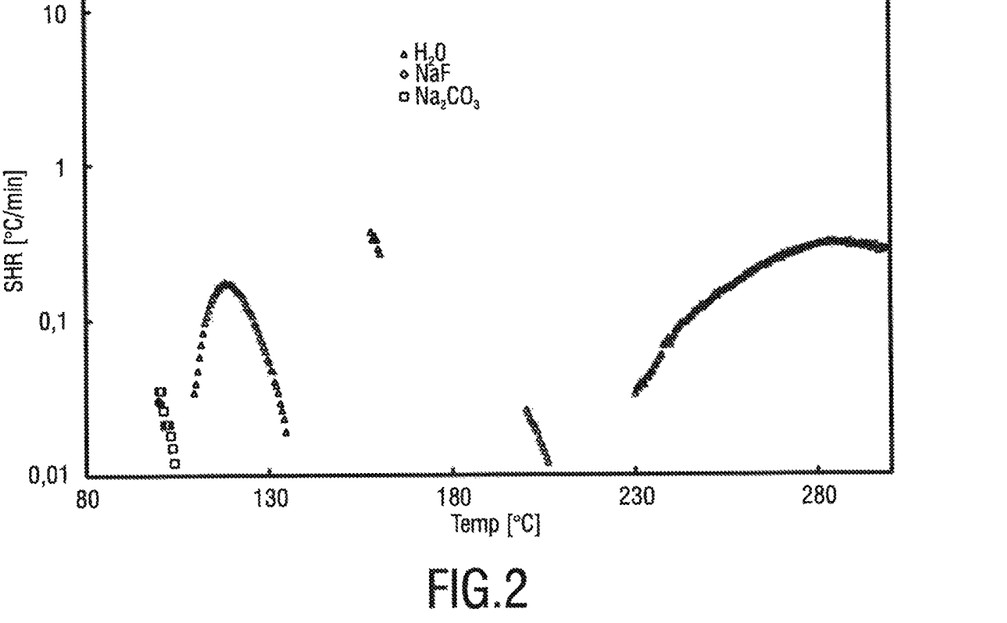
FIG. 2 is a graph illustrating the results of an exemplary calorimetric measurement (ARC measurement) with potentially suitable additives.

FIG. 2 shows the results of the trials. All of the salts (NaF, $Na_2CO_3$) compared with water (serving as reference), exhibit less self-heating. The self-heating of the reference can be seen in the region starting at 230° C. In this first trial it was found that sodium carbonate and sodium fluoride as additives used are able to lower the self-ignition tendency of the waste. Impressively it was found that, within the concentration ranges chosen, it was barely possible to observe any measurable, potentially critical self-heating of the samples.

Besides the ARC measurement, a DSC measurement (Differential Scan calorimetry) was carried out in parallel (not shown in the figures). The result of this measurement was that all of the salts lower the energy content (J/g) of the peak (reference around 200° C.). Additionally there is an increase in the onset temperature, this being the temperature at which there is an exothermic response.

On the basis of these findings, further trials were conducted with sodium carbonate and sodium fluoride. In these trials, different additive concentrations and different exposure times were investigated.

2. Varying the Concentrations and Exposure Times of the Salts

In a second trial, the effect of different concentrations and exposure times of the salts on the waste was investigated. The trial procedure was analogous to that described in section 1.

Figure 3:
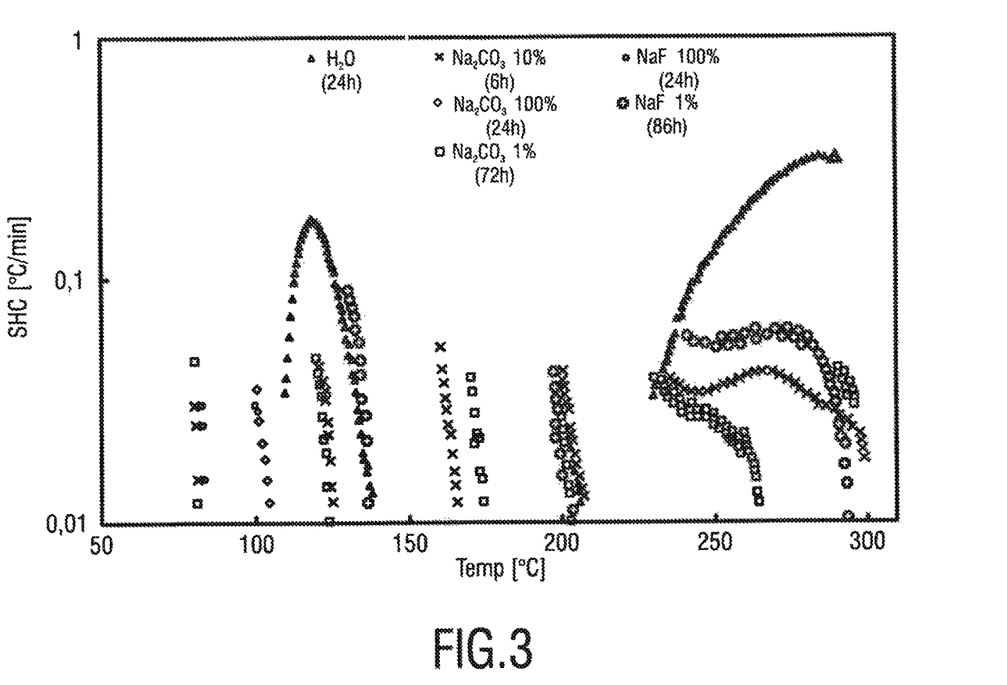
FIG. 3 is a graph illustrating the results of a further ARC measurement with further variations in respect of the additive.

The results of this ARC measurement are shown in FIG. 3.

FIG. 3 provides an overall view of the various self-heating processes on part of the samples. All of the samples admixed with additives as per the disclosure exhibit lower self-heating than the untreated sample. In the region starting at 230° C., a 1% NaF sample with 86 h exposure time exhibits greater self-heating at 1% $Na_2CO_3$ sample with 72 h exposure time. Additionally, the 10% $Na_2CO_3$ sample with 6 h exposure time likewise exhibits higher self-heating than the aforementioned 1% $Na_2CO_3$ sample with 72 h. This shows an influence of the exposure time as well as the influence of the salt concentration.

Figure 4:
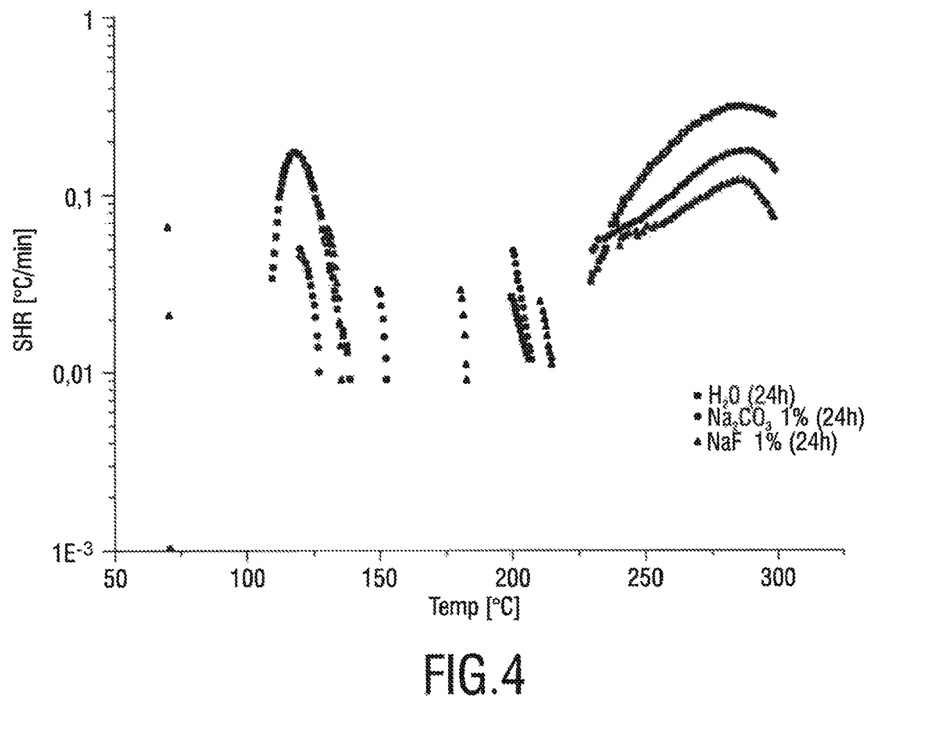
FIG. 4 is a graph illustrating the results of a further ARC measurement with further variations in respect of the additive.

In order clearly to delineate these influences, the NaF and $Na_2CO_3$ samples were repeated once again with identical exposure times of 24 hours. These results are shown in FIG. 4. In relation to the reference, the self-heating is reduced to 56.5% (carbonate) and 39.1% (fluoride).

3. Polishing Compositions Comprising a Salt Composed of Carbonate/Halogen Anion

On the basis of the findings obtained from the trials described above, in the next step a modified polishing emulsion was prepared, with the respective salts sodium fluoride, sodium carbonate, and potassium carbonate. These polishing compositions were used to carry out polishing trials with a robot. The resultant wastes were produced in a wet separator, and so the polishing waste was in a wet form. The trials encompassed the following steps, before an ARC measurement was carried out:

1. Stir 10 g of polishing waste into 200 ml of distilled water, leave to stand, re-agitating;
2 Rest solution for 24 h;
3. Isolate residue by filtration and wash with distilled water;
4 Dry residue for 24 h in a fume cupboard at room temperature; and
5 Store, pending ARC measurement, in a desiccator under molecular sieve.

Figure 5:
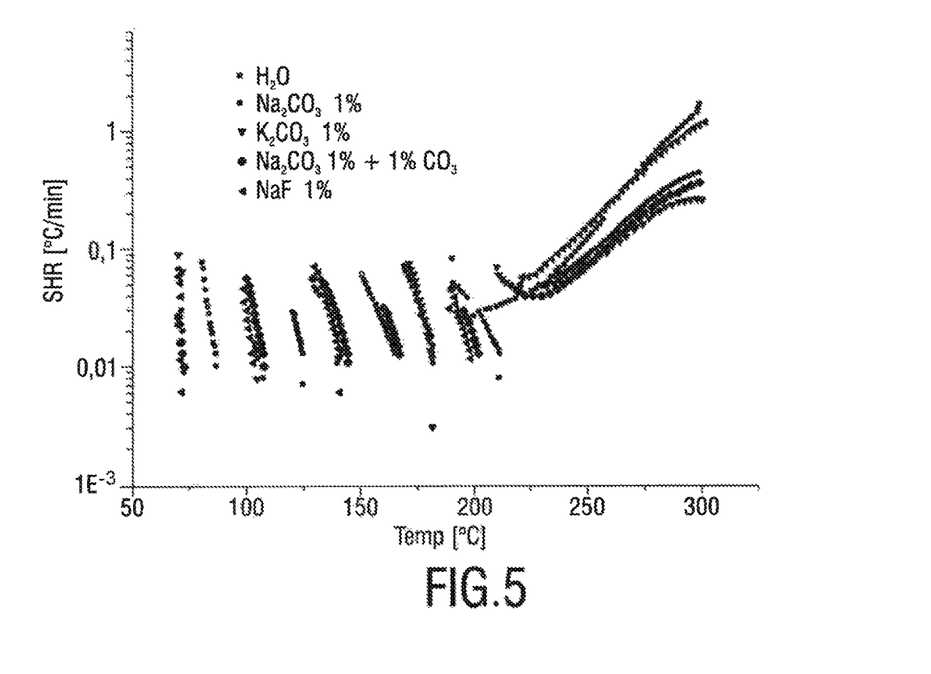
FIG. 5 is a graph illustrating the results of a further ARC measurement with further variations in respect of the additive.

The results of these trials are shown in FIG. 5.

In the trials it is apparent that in this set-up, the activity of sodium fluoride is poorer than that of the different carbonates. Further, in the case of both the reference sample and the fluoride sample, the curves toward the end become steeper as the temperature rises, whereas the carbonates toward the end show a somewhat flattening curve. Here, accordingly, it was possible to inhibit the self-heating and possibly even bring it to a standstill at higher temperatures.

Figure 6:
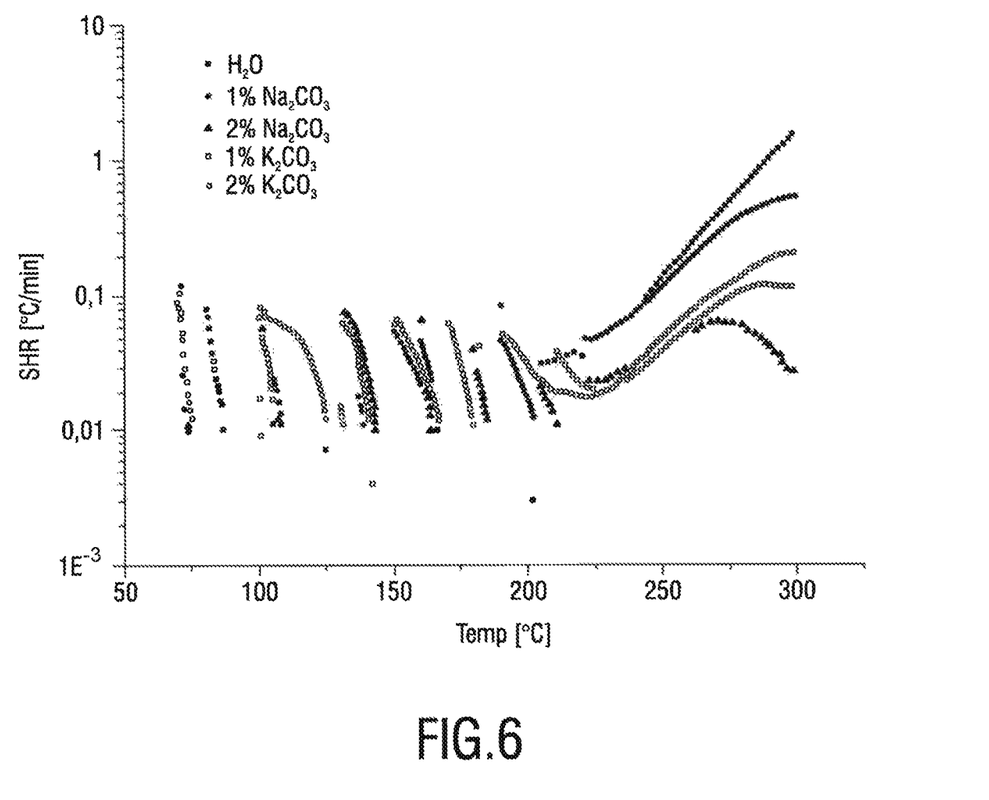
FIG. 6 is a graph illustrating the results of a further ARC measurement with further variations in respect of the additive.

In a further trial, therefore, the reference was admixed with 1 or 2 wt % sodium carbonate and investigated. FIG. 6 summarizes all of the carbonate samples. There is clear decrease apparent in the self-ignition tendency from the reference to the samples with 1 wt % carbonate. The sample with 2 wt %, as well as the lower self-heating, exhibits a peak at around 270° C., from which the self-heating decreases again. This sample shows no self-accelerated heating. According to these measurements, a higher concentration of additive (2% instead of 1%, for example) is preferential in terms of the inhibitory properties.

4. Conclusion

In the experimental trials, fluoride and carbonate proved to be suitable additives. On direct incorporation into the formulation, carbonate exhibits a better effect than fluoride, which in preliminary trials with older polishing composition waste appeared to be more suitable. The selection of the cation (sodium or potassium) does not appear to have any influence on the inhibitory activity of the additive, and can be optimized as part of the formulation work. Higher concentrations of additive may increase the safety of the wastes, as a result of reduced self-heating.

It has been possible, furthermore, to show that the self-ignition tendency can be lowered even in the case of wastes obtained in blasting processes or machining processes. These wastes typically consist primarily of metal dust or shavings, blasting medium, and water. As a result of the addition of the additive, the metals undergo reaction, and so it is widely possible to limit the generation of the highly ignitable hydrogen and, accordingly, the self-ignition tendency of this waste as well is lowered.

The invention claimed is:

1. A method for the surface treatment of workpieces by means of abrasive media, comprising the steps of:
   providing a treatment tool;
   providing an abrasive medium containing lipids;
   supplying a workpiece having a metal surface to be treated, wherein the metal surface to be treated is selected from the group consisting of magnesium, magnesium alloys, aluminum, aluminum alloys, titanium, titanium alloys, zinc and zinc alloys;
   surface treating the workpiece, involving removal of material and producing waste products containing lipids;
   adding a self-ignition inhibiting additive to lower a self-ignition tendency of the waste products that are formed in the step of surface treating the workpiece, the additive comprising a salt, wherein the salt is composed of at least one of a carbonate and a halogen anion; and
   processing the waste products.

2. The method as claimed in claim 1, wherein the step of processing the waste products comprises wetting the waste products.

3. The method as claimed in claim I, wherein the salt is selected from the group consisting of sodium carbonate, potassium carbonate, and sodium fluoride.

4. The method as claimed in claim 1, wherein the salt comprises a fluoride.

5. The method as claimed in claim 1, wherein the processing of the waste products is carried out in a wet separator which generates a wet waste.

6. The method as claimed in claim 5, wherein the additive is admixed within the wet separator or to the wet waste.

7. The method as claimed in claim 1, wherein the processing of the waste products comprises briquetting, and wherein the additive is added before the briquetting.

8. The method as claimed in claim 1, wherein the treatment tool is one or more of a grinding disk, a brushing disk, a polishing disk, a machining tool, and a blasting system.

9. The method as claimed in claim 1, wherein the treatment tool is one or more of a grinding disk, a brushing disk, a machining tool, and a polishing disk, and wherein the additive is introduced into or applied to the treatment tool.

10. The method as claimed in claim 1, wherein the abrasive medium is one or more of a polishing composition, a brushing composition, a blasting medium, a cutting material, and a grinding composition.

11. The method as claimed in claim 10, wherein the additive is added to the abrasive medium.

12. The method as claimed in claim 1, wherein the salt forms less than 10 wt % but more than 0.01 wt % of the abrasive composition.

13. The method as claimed in claim 1, wherein the lipids in the abrasive medium are selected from a group consisting of fats, oils, and waxes.

14. The method as claimed in claim 1, wherein the additive is admixed to the abrasive medium before surface treating the workpiece.

15. The method as claimed in claim 1, wherein the additive is admixed to the treatment tool.

16. The method as claimed in claim 1, wherein the additive is admixed with the waste products.

17. A method for polishing workpieces with abrasive media while lowering a self-ignition tendency of the waste products comprising:
   providing a polishing tool;
   providing an abrasive medium containing lipids;
   supplying a workpiece having a metal surface to be treated, wherein the metal surface to be treated is selected from the group consisting of magnesium, magnesium alloys, aluminum, aluminum alloys, titanium, titanium alloys, zinc and zinc alloys;
   polishing the workpiece, involving removal of material and producing waste products containing lipids; and
   processing the waste products;
   wherein the step of processing the waste products comprises adding a self-ignition inhibiting additive to the waste products formed in the step of polishing the workpiece, and
   wherein the additive comprises a salt composed of at least one of a carbonate and a halogen anion.

18. The method as claimed in claim 17, wherein the lipids in the abrasive medium are selected from a group consisting of fats, oils, and waxes.

19. A method for surface treatment of workpieces comprising:
- providing a treatment tool;
- providing an abrasive medium;
- supplying a workpiece having a surface to be treated, wherein the metal surface to be treated is selected from the group consisting of magnesium, magnesium alloys, aluminum, aluminum alloys, titanium, titanium alloys zinc and zinc alloys;
- surface treating the workpiece, involving removal of material from the workpiece and producing a waste product, the waste product containing lipids;
- adding a self-ignition inhibiting additive to lower a self-ignition tendency of the waste product that is formed in the step of surface treating of the workpiece, the additive comprising a salt, wherein the salt includes at least one of a carbonate and a halogen anion; and
- processing the waste products.

* * * * *